United States Patent [19]

Wilt

[11] Patent Number: 4,464,006
[45] Date of Patent: Aug. 7, 1984

[54] WIRING SYSTEM FOR TRUCKS WITH IMPROVED FIREWALL CONNECTION SYSTEM

[75] Inventor: Donald A. Wilt, Fremont, Calif.
[73] Assignee: Paccar Inc., Bellevue, Wash.
[21] Appl. No.: 414,960
[22] Filed: Sep. 3, 1982
[51] Int. Cl.³ .......................... H02B 3/08; H01R 9/00
[52] U.S. Cl. .................................. 339/126 R; 339/10; 339/186 M; 339/198 GA; 339/198 J
[58] Field of Search ................ 339/10, 125 R, 126 R, 339/126 RS, 186 R, 186 M, 198 R, 195 R, 195 M, 196 R, 196 M, 198 GA, 198 J, 198 P

[56] References Cited

U.S. PATENT DOCUMENTS

| | | | |
|---|---|---|---|
| 367,734 | 8/1887 | Widdicombe | 174/60 |
| 1,042,747 | 10/1912 | Ziegler | 339/214 R |
| 1,316,001 | 9/1919 | Teachworth | 123/198 R |
| 1,517,017 | 11/1924 | Roth | 339/198 R |
| 2,513,080 | 6/1950 | Burtt | 173/328 |
| 2,698,423 | 12/1954 | Modrey et al. | 339/214 |
| 2,790,153 | 4/1957 | Arson | 339/184 |
| 2,823,251 | 2/1958 | Clark | 174/153 |
| 2,962,691 | 11/1960 | Mande et al. | 339/214 |
| 3,040,289 | 6/1962 | Wicks | 339/126 |
| 3,046,516 | 7/1962 | Tymkewicz | 248/27.1 |
| 3,103,400 | 9/1963 | Gaither | 339/130 |
| 3,137,535 | 6/1964 | Collier et al. | 339/186 M X |
| 3,140,139 | 7/1964 | Urban | 339/192 |
| 3,146,052 | 8/1964 | Burch et al. | 174/153 |
| 3,216,140 | 11/1965 | Termet | 42/35 |
| 3,259,872 | 7/1966 | Kyle | 339/94 |
| 3,292,133 | 12/1966 | Burch et al. | 339/126 |
| 3,412,368 | 11/1968 | Asbridge et al. | 339/126 |
| 3,456,231 | 7/1969 | Paullus et al. | 339/60 |
| 3,753,212 | 8/1973 | Yamada et al. | 339/91 |
| 3,760,336 | 9/1973 | Cerwin | 339/92 |
| 4,099,821 | 7/1978 | Debaigt | 339/91 |
| 4,415,044 | 11/1983 | Davis | 339/198 J |

FOREIGN PATENT DOCUMENTS 590873  7/1947  United Kingdom ............ 339/195 R

Primary Examiner—Joseph H. McGlynn
Assistant Examiner—Steven C. Bishop
Attorney, Agent, or Firm—Owen, Wickersham & Erickson

[57] ABSTRACT

An electrical connection assembly for use at a firewall bulkhead for connecting the electrical conduits coming from one side of the firewall with those coming from the other side. A main connection panel has a unitary body of insulating material with a series of rows of through openings between its faces. In each opening is metallic tubular first insert having, between the faces, in interiorly threaded portion and a radially inset smooth-walled portion. A set of connector plugs, each different in outline from the other and each having at least one row of through openings spaced to match a corresponding row on the panel, fits against and is keyed to the panel, so that each plug can occupy only one possible position, aligning the openings. In each of these openings is a tubular, interiorly threaded second insert. Solid electrical binding posts include a set for the panel, each having a portion threaded into the interiorly threaded portion of each first insert, and a connector-clamping head. In a set for the plugs, the binding post has a clamping head, a threaded shank threaded into each second insert, and an extension projecting out beyond the plug and extending into and in electrical contact with the smooth-walled portion of a first insert. A cover plate helps to hold the plugs in place against vibration.

8 Claims, 16 Drawing Figures

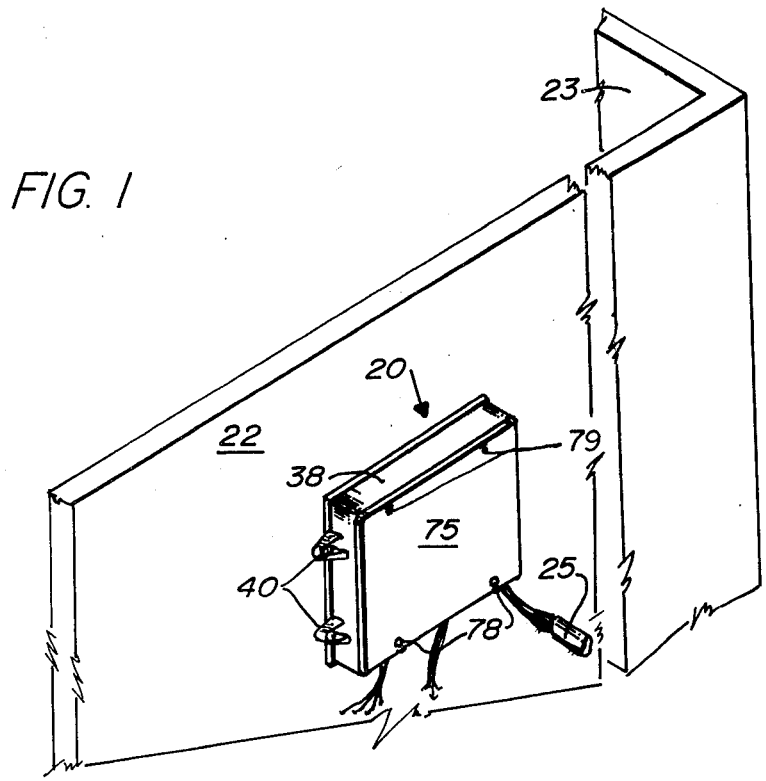
FIG. 1
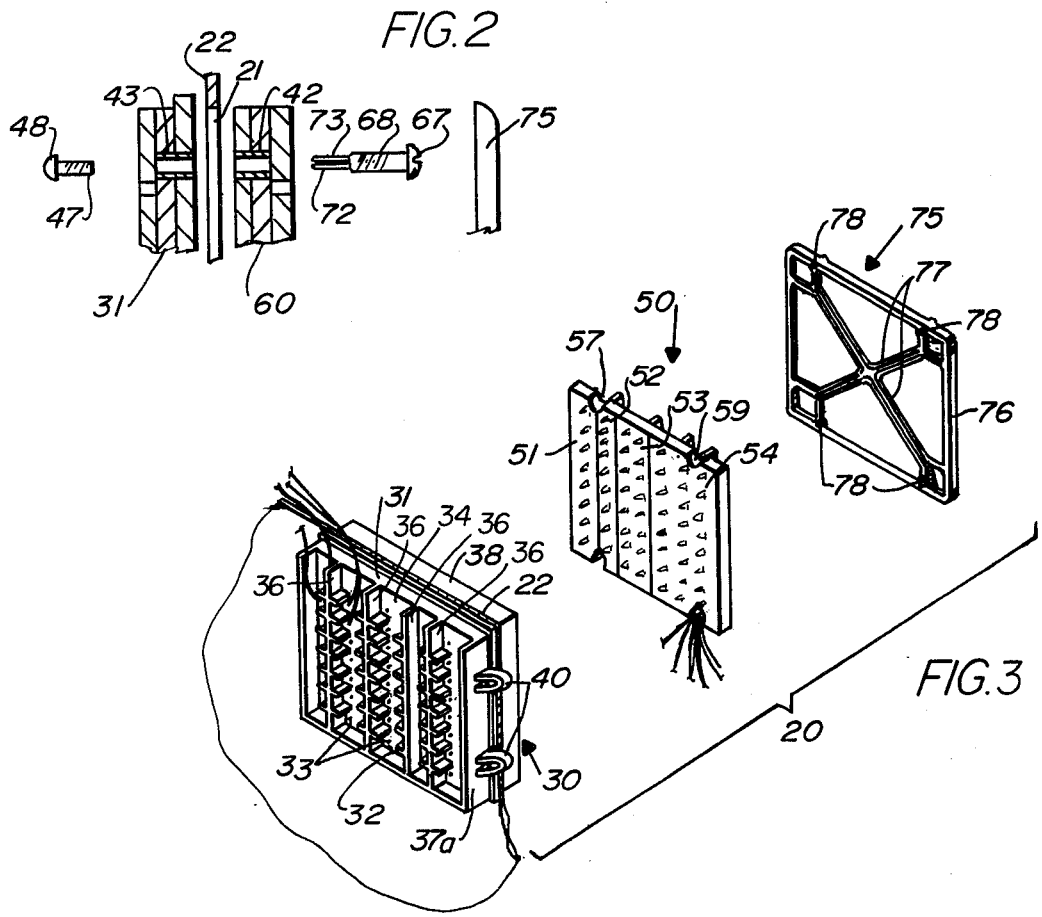
FIG. 2
FIG. 3

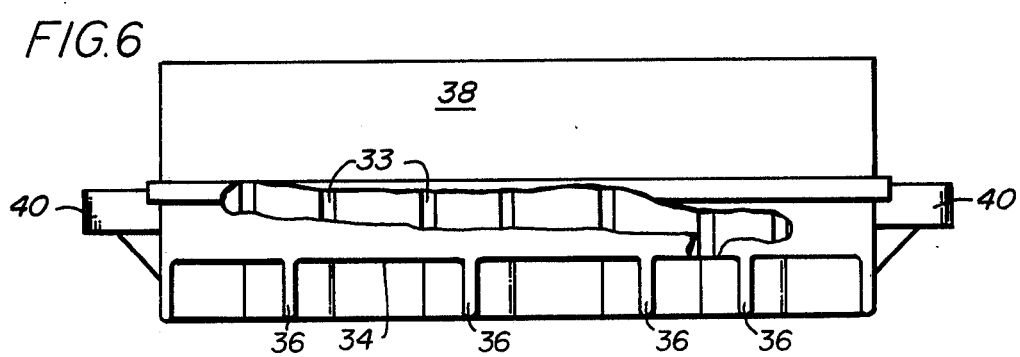
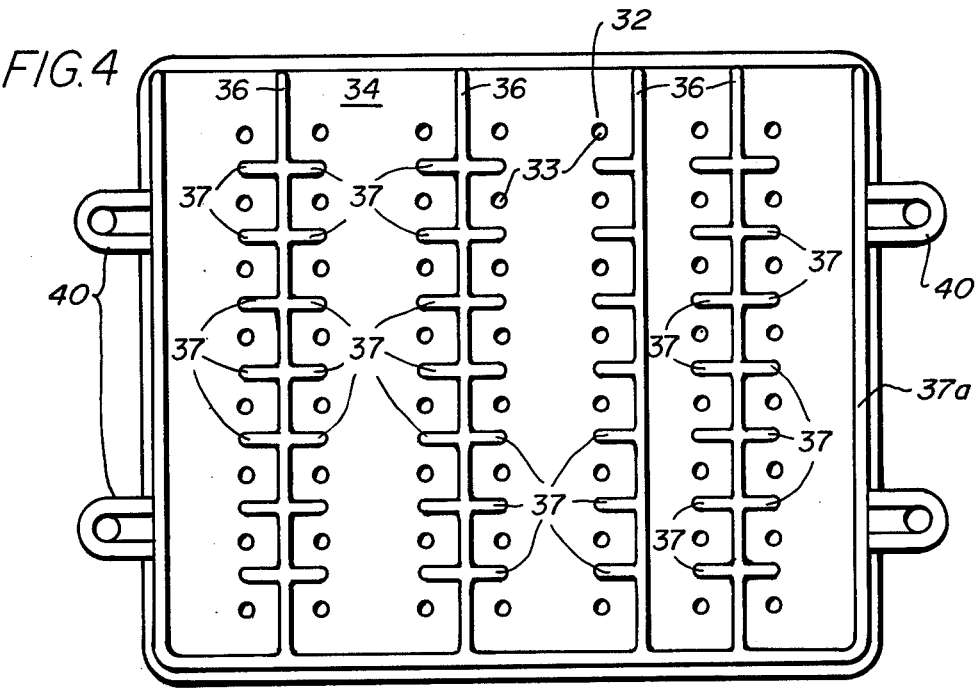
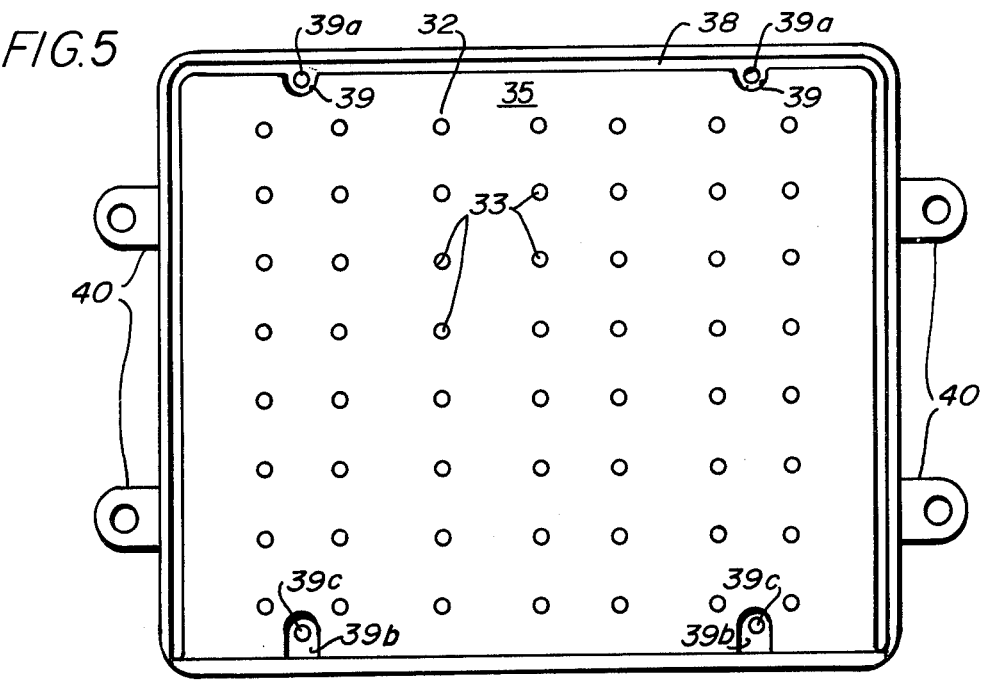

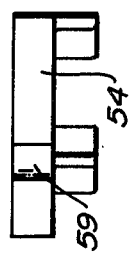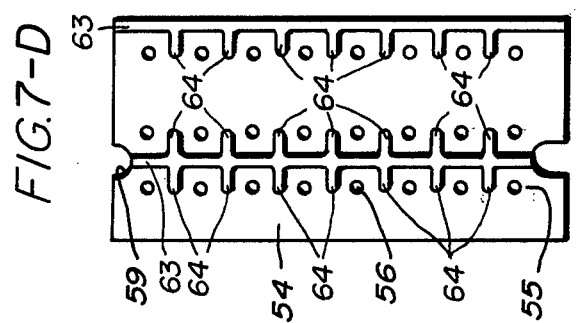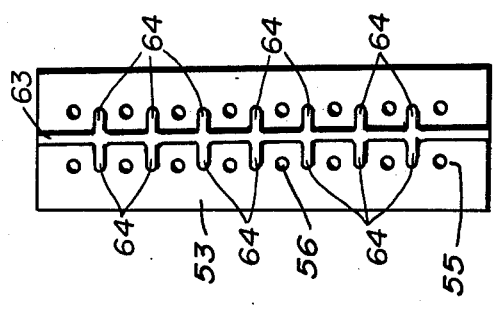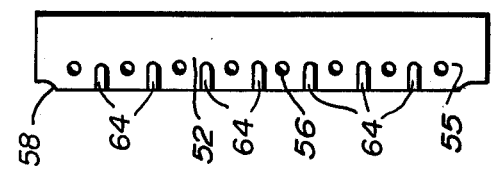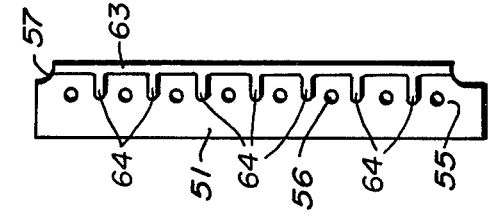

WIRING SYSTEM FOR TRUCKS WITH IMPROVED FIREWALL CONNECTION SYSTEM

This invention relates to improvements in electrical wiring systems for heavy duty vehicles, especially for trucks. It includes a novel connector system for installation at the vehicle's firewall.

BACKGROUND OF THE INVENTION

In assembling a truck a series of wiring harnesses is used. Thus, there may be one or two harnesses for the engine (e.g., for the fuel solenoid, generator, and for each of many temperature and electric monitors), another harness for the headlights, turn signals, horn etc., another harness for the chassis (e.g., for the tail lights, stop lights, speedometer and so on), and another harness for trailer attachment (for the tail lights, turn signals, clearance lights, etc.). Then another harness is provided for the cab itself for connections to the instrument and control board. During assembly, each wire is connected at one end to the pertinent instrument or device; the other end of each wire of each harness except the one for the cab interior is to be connected to a wire of the cab harness. This connection typically is made at the firewall. Connection of each wire individually—though color-coded for identification—is time consuming and likely to lead to mistakes. Therefore, it is preferred to bring each wire in any one harness to a common multi-terminal connector assembly.

The present invention provides a system whereby a multi-terminal connector assembly for each outside-the-cab harness can be simply plugged in to a firewall-mounted, inside-the-cab, multi-terminal connector for the cab harness. Moreover, it provides for improved connectors and for positive assurance that each multi-terminal connector will be used at the proper location.

One object of the invention is to provide an improved electrical bulkhead connector and test center for large trucks having a large number of electrical leads.

Another object is to provide an electrical system that can be provided at reasonable cost.

Another object is to provide for multi-terminal connectors that can be installed simply and quickly.

Another object is to provide a system with airtight firewall penetration.

A further object is to provide watertight underhood connections.

Another object is to provide a system able to accommodate additional or decreased wiring without modification to any connectors.

Another object is to provide a system with accessible circuit test points on both sides of a firewall, without requiring disconnections.

A further object is to provide a readily repairable electrical connection system.

SUMMARY OF THE INVENTION

A main connection panel has molded-in, partially threaded sleeves and is prewired to the cab harness. This panel is inserted in a prepunched hole in the firewall and is secured to it by fasteners. An individual outside-the-cab harness connector for each harness has molded-in threaded sleeves and is prewired with individual contact members. Assembly is completed simply by plugging these individual harness connectors into the main panel, the individual connectors being keyed to assure proper assembly. Then a cover, which is also a retainer for the plugs, is installed, and the cab-to-chassis interface is complete.

The electrical connection assembly of this invention is used at a fire-wall bulkhead, for example in a truck, for connecting electrical conduits coming from one side of the firewall with those coming from the other side. Typically, each of these electrical conduits terminates in a flat, often generally annular, connection.

The assembly includes the main connection panel for insertion in an opening through the firewall and for attachment to the firewall. The panel comprises a unitary body of insulating material having a series of rows of through openings extending between a first face and a second face. The second face is preferably flat, while, preferably, a series of ribs on the first face separates each row from its adjacent rows and each opening of each row from its adjacent openings. Preferably a marginal frame extends out from the edges bounding the second face and provides a plurality of keying means. Brackets and screws, or other suitable securing means, enable attachment of the main panel to the firewall.

Conductive, usually tubular, first inserts or sleeves are secured in the panel, as by being molded or inserted ultrasonically into it. One such insert is in and extends through each through opening. Each of these inserts preferably has an interiorly threaded portion leading in from the first face of the panel and a radially inset smooth-walled portion leading from the interiorly-threaded portion to the second face. A series of first solid electrical binding posts, each having an exteriorly threaded portion, are threaded into the interiorly threaded portion of each first insert or sleeve. These posts have a head for clamping a first flat connector to a first insert at the first face.

Matching the panel is a set of connector plugs. Each plug is different in outline from all the others, and each has at least one row of through openings spaced to match a corresponding row on the panel. There may be one plug for the engine, one for the chassis, one for the hood, and one for the trailer connection. The set fits within and fills the marginal frame and is keyed thereto, so that each plug can occupy only one possible position therewithin, and in that position its openings are accurately aligned with the corresponding openings of the panel. Each plug comprises a body of insulating material providing its through openings. Each body preferably has a first flat face for abutting the second flat face of the panel and a second outer face. This outer face may be provided with projecting ribs, so that when the set is installed in the panel each row of openings is separated from its adjacent rows and each opening is separated from its adjacent openings, as in the panel.

A series of tubular, interiorly threaded second inserts or sleeves is secured as by molding-in or ultrasonic insertion, one in each opening, in each plug body, and a series of second solid electrical binding posts is provided for these second inserts. Each post has a head, a threaded shank threaded into a second insert, and an extension, preferably having a diametral split thereacross, projecting out beyond the body and extending into and in electrical contact with the smooth-walled portion of a first insert. These second posts are used for clamping a second flat connector between the head of each second post and its associated second insert. As a result, the first and second binding posts are electrically connected together.

Other objects and advantages of the invention will appear from the drawings and from the following description of a preferred form of the invention.

BRIEF DESCRIPTION OF THE DRAWINGS

FIG. 1 is a fragmentary view in perspective of the connector installed in a firewall of a truck between the cab interior and the engine compartment.

FIG. 2 is a partially exploded view in section through the connector of FIG. 1.

FIG. 3 is a partially exploded view of a connector system embodying the principles of the invention; only a few wires are shown connected.

FIG. 4 is a view in front elevation (i.e., from inside the cab) of the main connector panel of FIG. 1, without wires connected to it.

FIG. 5 is a view in rear elevation of the main connector panel of FIG. 4.

FIG. 6 is a plan view of the panel of FIGS. 4 and 5.

FIGS. 7A, 7B, 7C, and 7D are views in front elevation of the four connector plugs of FIG. 3 shown separated.

FIGS. 8A, 8B, 8C, and 8D are plan views thereof.

DESCRIPTION OF A PREFERRED EMBODIMENT

Figure 9:
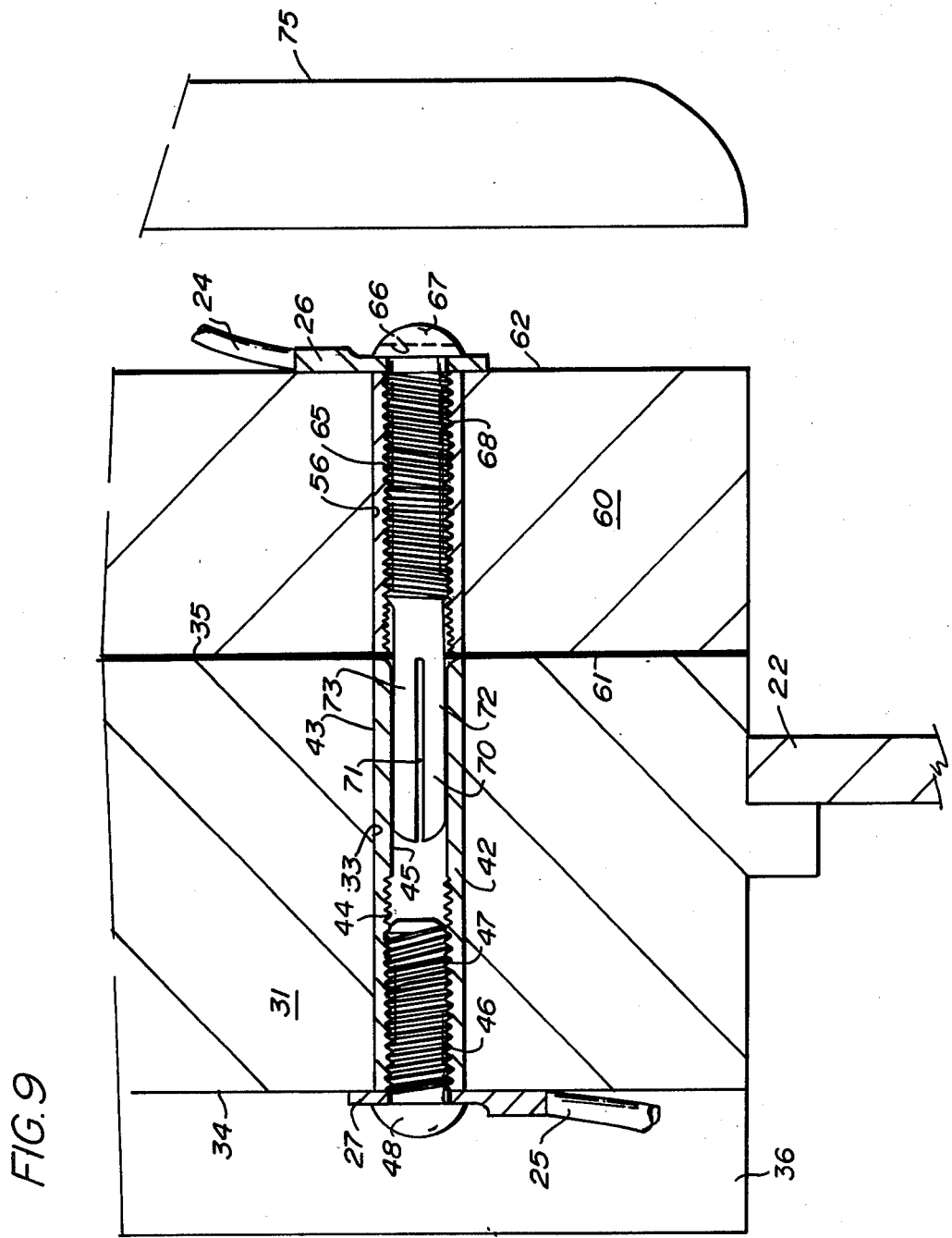
FIG. 9 is an enlarged fragmentary view in section of a portion of the assembly of FIG. 2.

FIGS. 1 and 2 show an electrical connection assembly 20 embodying the invention installed in an opening 21 of a fire-wall bulkhead 22 in a truck cab 23. This assembly 20 connects electrical conduits 24 coming from the engine side of the firewall 22 with conduits 25 inside the cab 23, many of which are connected to switches or instruments as on a vehicle dashboard. Each electrical conduit 24, 25 terminates in a generally annular flat (ring terminal) connection 26, 27 (see FIG. 9).

The assembly 20, shown in exploded form in FIG. 3, includes a main connection panel 30 for insertion in the opening 21 (FIG. 2) through the firewall 22 and for attachment to the firewall 22. The panel 30 has a unitary body 31 of insulating material having a series of rows 32 of through openings 33 extending between a first face 34 and a second flat face 35. A series of vertical ribs 36 on the first face 34 separate each row 32 from its adjacent rows, and branch ribs 37 separate each opening 33 of each row 32 from its adjacent openings 33. Along these edges (the lower edge and two side edges) there may be a marginal dam 37a that is flush with the outer faces of the ribs 36 and 37. The wires inside the cab may pass through the edge without a dam. A cover may be provided here, if desired, for dust protection.

A marginal frame or dam 38 extends out from around three edges—the upper edge and the two side edges—of the second face 35 and also provides a plurality of upper keying means 39 (FIG. 5) around a molded-in threaded tube 39a. Spaced apart along the lower edge, where there is no dam, because the wires will enter here from the engine side of the firewall 22, are two keying bosses 39b that extend to a height flush with the edge of the device 38 and include threaded, molded-in tubes 39c. The panel 30 has brackets 40 enabling attachment of the panel 30 to the firewall 22 by screws 41, causing the panel 30 to bear against the firewall 22 in an airtight, watertight connection.

As shown in FIG. 9, a series of tubular metal first sleeves or inserts 42 is secured in the panel 30, one insert 42 in and extending through each through opening 33. Each insert 42 has an outer cylindrical wall 43, an interiorly threaded portion 44 leading in from the first face 34 and a radially insert smooth-walled portion 45 leading from the portion 44 to the second face 35. Insertion of the sleeves or inserts 42 may be done by ultrasonic methods, or the sleeves may be molded in.

A series of first solid electrical binding posts 46 is provided. Each post 46 has an exteriorly threaded portion 47 which is threaded into the interiorly threaded portion 44, and a head 48 for clamping a first generally annular connector 27 to each of the first inserts 42 at the first face 34.

Matching the panel 30 is a set 50 of connector plugs 51, 52, 53, and 54. Each plug is different in outline from all the others, and each has at least one row 55 of through openings 56, spaced to match those on the panel 30. All the plugs of the set 50 fit together within and fill the marginal frame 38 and are keyed thereto by the keys 39, by the presence or absence of keying recesses 57, 58, 59, all of which are different from each other, so that each said plug 51, 52, 53, 54 can occupy only one possible position therewithin, in which its openings 56 are accurately aligned with corresponding openings 33 of the panel 30.

Each plug 51, 52, 53, 54 has a body 60 of insulating material providing its through openings 56. Each body 60 has a first flat face 61, for abutting the second flat face 35 of the panel 30, and a second outer face 62. The outer face 62 is preferably provided with projecting ribs 63, so that when the set 50 is installed in the panel 30 each row of openings 56 is separated from its adjacent rows. Branch ribs 64 separate each opening 56 from its adjacent openings 56.

A series of tubular, interiorly threaded second sleeves or inserts 65 are each secured in an opening 56, as by an ultrasonic method employing pressure. A second solid electrical binding post 66 has a head 67, a threaded shank 68 threaded into each second insert 65, and an extension 70. The extension 70 may have a diametral split 71 thereacross, so that its two portions 72 and 73 tend to spring apart slightly from each other. The extension 70 projects out beyond the plug 51, 52, 53, or 54 and extends into and in electrical contact with the smooth-walled portion 43 of a first insert 40. The head 67 clamps a second generally annular connector 27 to a second insert 56. Thus, the first and second binding posts 46 and 66 are electrically connected together.

When the plugs 51, 52, 53, and 54 are plugged into the main connection panel 30, the wires are arranged to pass across the bottom edge. Then a cover 75 is installed. This cover 75 (see FIG. 3) has a marginal rim 76 that engages the dam 38 on its edges and an open space for the passage of the wires is left at the bottom edge. Diagonal reinforcing members 77, flush with the rim 76, engage the ribs 63 and 64 and force the plugs 51, 52, 53, and 54 into their proper, fully engaged position in the panel 30. Bosses 78, also flush with the rim 76, engage the bosses 39 and 39b, and screws 79 passing therethrough hold the assembly 20 together, even against vibration.

Figure 10:
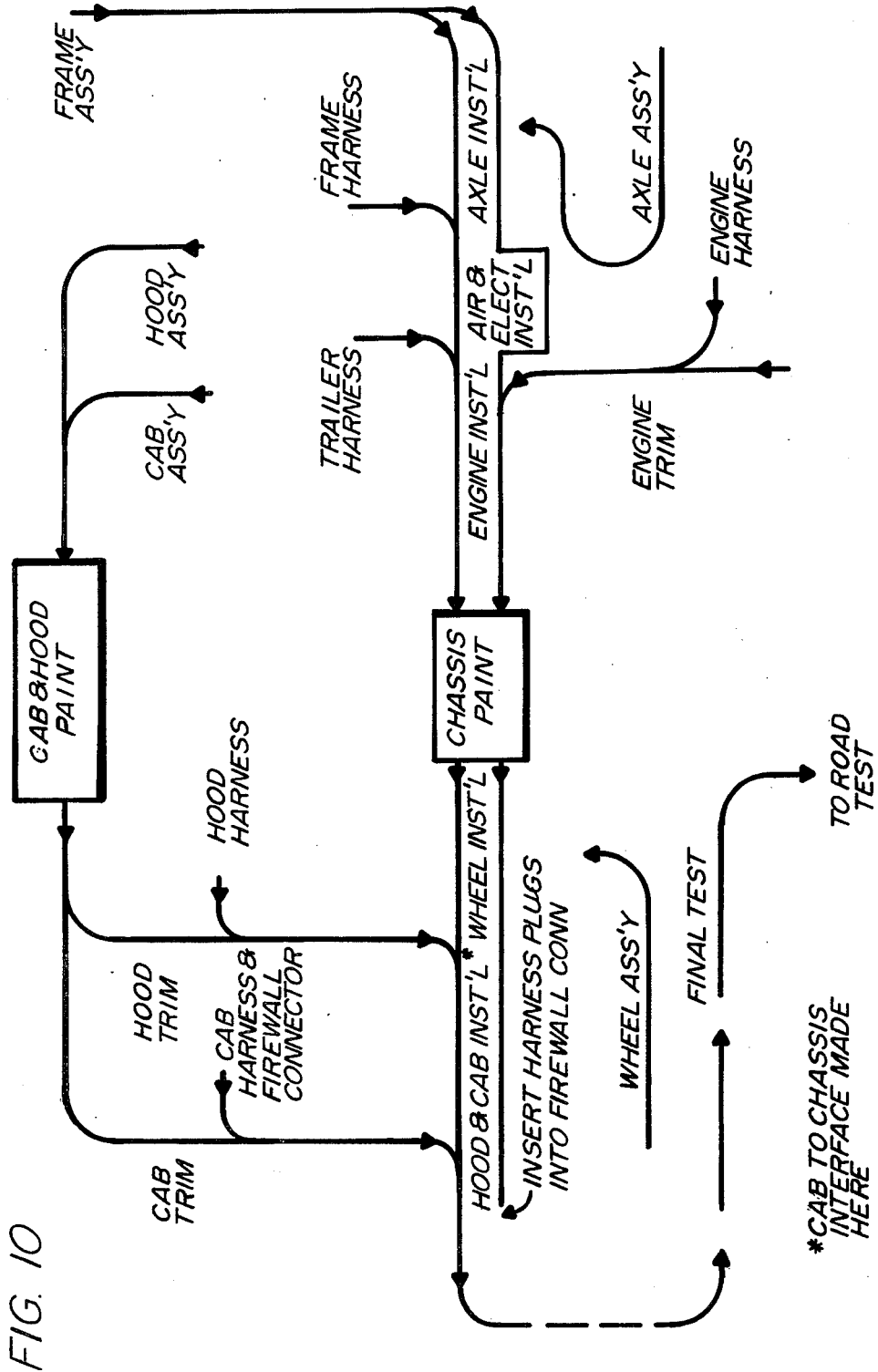
FIG. 10 is a diagram of a truck assembly line showing stations at which the various harnesses are assembled into the truck.

FIG. 10 shows a truck assembly sequence. After the frame and axle assembly have been put together, the frame or chassis electrical harness and the trailer harness are installed. The chassis harness may include the wires 24 for the tail lights, the stop lights, the body marker lights, the back-up lights, and the turn signals. It also includes the speedometer wire 24, the wires for the measurement of transmission temperature and the temperature of each axle. Wires transmit also the level of fuel in each tank (four fuel tanks per truck are common) and the electricity for the fuel heater, air dryer, and a fuel filter water alarm. Wires 24 may also supply electricity for an anti-lock brake alarm and a cruise control. All these have wires 24 with a connector 26 at one end, and each of the connectors 26 is secured by one of the binding posts 67 to a second insert 65 on the plug 53, projecting through that plug.

The trailer harness typically includes wires 24 for the trailer tail lights, clearance lights, back-up lights, and interior lights, as well as for the trailer's turn signals. These wires 24 (and others if needed) are all connected at one end to a connector 26, which is clamped by a post 67 to an insert 65 on the plug 51. The extension 70 of the inset 65 projects beyond the plug 51.

Meanwhile, the engine trim is being installed on the engine, and this trim may include the engine harness. The engine harness has wires 24 leading to the fuel solenoid, the battery current read-off for the ammeter and voltmeter, to the starter relay, to the generator or charging system, to the tachometer, to an ether start solenoid, to detectors for water temperature, water level, and oil temperature, to engine alarms and an engine shut down system, to an engine brake retarder, a fan clutch override, an air conditioning clutch, and to air-conditioning pressure switches. All these wires 24 have a connection member 26 at one end which is secured by a binding post 67 in an insert 65 of the plug 54. The extension 70 of the insert 65 propels beyond the plug 54.

A separate assembly line is being used at the same time to assemble and paint the cab and hood. Thereafter, a hood harness is installed in the hood sub-assembly. This hood harness includes wires 24 for the headlights, both low and high beams, foglights, driving lights, turn signals, and horn. These wires 24 lead to connection members 26 which are also secured by binding posts 67 to respective inserts 65, which are in a plug 52, the extension 20 extending beyond the plug 52.

Finally a cab harness has wires 25 leading to all the indicators and switches in the cab, most of which are located on the dashboard. Each wire 25 ends with a connection member 27 and is held by a binding post 46 against an insert 42 in the main panel 30. At this station, the main panel 30 is placed in the opening 21 and secured to the firewall 22 by the screws 41 and brackets 40. This results in airtight firewall penetration, as well as a watertight connection.

When the chassis has been painted and the wheels installed on the axles, the cab and hood are installed. Then, in a few seconds, the plugs 51, 52, 53, and 54 are plugged into the main panel 30, the keys 39 and 57, 58, and 59 assuring that no mistake will be made here. Finally, the cover 75 is attached by the screws 79, holding the plugs 51, 52, 53, and 54 firmly in place, and the entire electrical system is in order, ready for the batteries, if they are not already in place.

Thus, the use of the plugs 51, 52, 53, and 54 for their harness and the main panel 30 for the cab harness, together with the cover 75, makes the final stage fool proof and all but instantaneous. Moreover, repair is made easier. There are accessible circuit test points—i.e., the connections 26 and 27 and the posts 46 and 67—on each side of the firewall 22.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. An electrical connection assembly for use at a firewall bulkhead of a truck, for connecting electrical conduits coming from one side of the firewall with those coming from the other side, each electrical conduit terminating in a connection member, including in combination:

a main connection panel for insertion in an opening through said firewall and airtight, watertight attachment to said firewall, said panel having a unitary body of insulating material having a series of rows of through openings extending between a first outer face and a second flat face, a series of metallic tubular first inserts secured airtight in said panel, one in and extending through each said through opening, each having an interiorly threaded portion leading in from said first face and a radially inset smooth-walled portion leading from said interiorly-threaded portion to said second face, a series of first solid electrical binding posts, each having an exteriorly threaded portion, threaded into said interiorly threaded portion of each said first insert, and a head for clamping a first connection member to a said first insert at said first face, a set of connector plugs, each having at least one row of through openings spaced to match a corresponding row on said panel, keying means on said plugs and said panel for providing that each said plug can occupy only one possible position with respect to said panel in which the plug openings are accurately aligned with corresponding openings of said panel, each said plug having a body of insulating material providing its said through openings, said body having a first flat face for abutting said second flat face of said panel and a second outer face, a series of tubular, interiorly threaded second inserts, one secured airtight in each opening in each said plug body, a second solid electrical binding post having a head, a threaded shank threaded into each said second insert, and an extension having a diametral split thereacross projecting out beyond said body and extending into and in electrical contact with said smooth-walled portion of a said first insert, for clamping a second connection member between the head of each said second post and said second insert, so that said first and second binding posts are electrically connected together.

2. The assembly of claim 1 having isolating means on said panel and each said plug, unitary with its said panel or plug, for separating each through opening from every other through opening.

3. The assembly of claim 2 wherein said isolating means comprises a series of ribs on each said outer face separating each row from its adjacent rows and each opening of each row from its adjacent openings.

4. The assembly of claim 1 wherein said keying means comprises a marginal frame extending out from said second face of said panel and providing a plurality of keying projections, said set of plugs fitting within and filling said marginal frame and mating with said projections, each plug having a uniqe relation to said frame and projections.

5. The assembly of claim 4, said marginal frame extending out, from three edges only of said second face, and a cover plate secured to said main panel and holding said plugs firmly in place against vibration, a space below the fourth edge and said cover providing space for passage of wires secured to said second binding posts.

6. An electrical connection assembly for use at a firewall bulkhead, for connecting electrical conduits coming from one side of the firewall with those coming from the other side, each electrical conduit terminating in a flat connection member, including in combination:

a main connection panel for insertion in an opening through said firewall and attachment to said firewall, said panel having a unitary body of insulating material with a series of rows of through openings extending between a first face and a second face, and keying means associated with said second face, and securing means enabling attachment of said panel to said firewall, a series of conductive tubular first inserts secured airtight in said panel, one in and extending through each said through opening, each having an interiorly threaded portion leading in from said first face and a radially inset smooth-walled portion leading from said interiorly-threaded portion to said second face, a series of first solid electrical binding posts, each having an exteriorly threaded portion, threaded into said interiorly threaded portion of each said first insert, and a head for clamping a first flat connection to a said first insert at said first face, a set of connector plugs, each different in outline from the other and each having at least one row of through openings spaced to match a corresponding row on said panel, said set being keyed to said keying means so that each said plug can occupy only one possible position therewithin, in which position its said openings are accurately aligned with corresponding openings of said panel, each said plug having a body of insulating material providing its said through openings, said body having a first face for abutting said second face of said panel and a second outer face, a series of tubular, interiorly threaded, second conductive inserts, one secured airtight in each opening in each said plug body, a series of second solid electrical binding posts each having a head, a threaded shank threaded into a said second insert, and an extension projecting out beyond said body and extending into and in electrical contact with said smooth-walled portion of a said first insert, for clamping a second flat connection between the head of each said second post and said second insert, so that said first and second binding posts are electrically connected together.

7. An electrical connection assembly for use at a firewall bulkhead of a truck, for connecting electrical conduits coming from one side of the firewall with those coming from the other side, each electrical conduit terminating in a generally annular connector, including in combination:

a main connection panel for insertion in an opening through said firewall and attachment to said firewall, said panel having a unitary body of insulating material with a series of rows of through openings extending between a first face and a second flat face, a series of projecting ribs on said first face separating each row from its adjacent rows and each opening of each row from its adjacent openings, a marginal frame extending out from the edge of said second flat face, a plurality of keying means, and securing means enabling attachment of said panel to said firewall, a series of metallic tubular first inserts secured airtight in said panel, one in and extending through each said through opening, each having an interiorly threaded portion leading in from said first face and a radially inset smooth-walled portion leading from said interiorly-threaded portion to said second face, a series of first solid electrical binding posts, each having an exteriorly threaded portion, threaded into said interiorly threaded portion of each said first insert, and a head for clamping a first generally annular connector to said first insert at said first face, a set of connector plugs, each different in outline from the other and each having at least one row of through openings spaced to match a corresponding row on said panel, said set fitting within and filling said marginal frame and keyed thereto so that each said plug can occupy only one possible position therewithin, in which position its said openings are accurately aligned with corresponding openings of said panel, each said plug having a body of insulating material providing its said through openings, said body having a first flat face for abutting said second flat face of said panel and a second outer face provided with projecting ribs, so that when said set is installed in said panel each said row of openings is separated from its adjacent rows and each opening is separated from its adjacent openings, a series of tubular, interiorly threaded second inserts, one secured airtight in each opening in each said plug body, a series of second solid electrical binding posts each having a head, a threaded shank threaded into a said second insert, and an extension having a diametral split thereacross projecting out beyond said body and extending into and in electrical contact with said smooth-walled portion of a said first insert, for clamping a second generally annular connector between the head of each said second post and said second insert, so that said first and second binding posts are electrically connected together.

8. The assembly of claim 7 wherein said marginal frame extends out from three edges only of said main panel, to provide space for passage of wires connected to said connector plugs at said second inserts, and a cover plate engaging said marginal frame and said keying means, engaging on said ribs of said plugs and holding said assembly together against vibration.

* * * * *